United States Patent
Seo et al.

(10) Patent No.: US 9,516,608 B2
(45) Date of Patent: Dec. 6, 2016

(54) POWER CONTROL METHOD FOR DEVICE-TO-DEVICE (D2D) COMMUNICATION IN WIRELESS COMMUNICATION SYSTEM AND APPARATUS THEREFOR

(71) Applicant: LG ELECTRONICS INC., Seoul (KR)

(72) Inventors: Daewon Seo, Seoul (KR); Hakseong Kim, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 14/899,431

(22) PCT Filed: Jun. 26, 2014

(86) PCT No.: PCT/KR2014/005689
§ 371 (c)(1),
(2) Date: Dec. 17, 2015

(87) PCT Pub. No.: WO2015/005601
PCT Pub. Date: Jan. 15, 2015

(65) Prior Publication Data
US 2016/0150484 A1    May 26, 2016

Related U.S. Application Data

(60) Provisional application No. 61/844,838, filed on Jul. 10, 2013.

(51) Int. Cl.
*H04B 7/00* (2006.01)
*H04W 52/32* (2009.01)
(Continued)

(52) U.S. Cl.
CPC .......... *H04W 52/322* (2013.01); *H04W 52/04* (2013.01); *H04W 52/242* (2013.01); *H04W 52/262* (2013.01); *H04W 52/283* (2013.01)

(58) Field of Classification Search
None
See application file for complete search history.

(56) References Cited

U.S. PATENT DOCUMENTS 9,198,137 B2 * 11/2015 Koskela ................ H04W 4/005
2006/0068826 A1 * 3/2006 Leonard ................ H04W 52/12
455/522

(Continued)

FOREIGN PATENT DOCUMENTS

KR 10-2012-0074251    7/2012
KR 10-2013-0015094    2/2013

(Continued)

OTHER PUBLICATIONS

PCT International Application No. PCT/KR2014/005689, Written Opinion of the International Searching Authority dated Sep. 29, 2014, 16 pages.

*Primary Examiner* — Dominic Rego
(74) *Attorney, Agent, or Firm* — Lee Hong Degerman Kang Waimey

(57) ABSTRACT

The present invention relates to a method for power control by a first terminal that performs device-to-device (D2D) communication in a wireless communication system. More specifically, the method comprises the steps of: receiving, from a base station, a first signal including power control information defined for D2D communication; and transmitting a second signal according to transmission power determined on the basis of the received first signal, wherein the power control information indicates one of broadcast and groupcast, and the second signal is differently masked and transmitted according to a transmission method of the second signal.

12 Claims, 14 Drawing Sheets

(51) Int. Cl.
  *H04W 52/04* (2009.01)
  *H04W 52/24* (2009.01)
  *H04W 52/26* (2009.01)
  *H04W 52/28* (2009.01)

(56) References Cited

U.S. PATENT DOCUMENTS

| | | | | |
|---|---|---|---|---|
| 2006/0291410 | A1* | 12/2006 | Herrmann | H04W 4/06 370/328 |
| 2008/0069039 | A1* | 3/2008 | Li | H04W 36/02 370/329 |
| 2009/0325625 | A1* | 12/2009 | Hugl | H04W 52/16 455/522 |
| 2010/0197338 | A1* | 8/2010 | Bonneville | H04W 52/244 455/522 |
| 2010/0323637 | A1* | 12/2010 | Roman | H04B 7/0689 455/101 |
| 2011/0243010 | A1* | 10/2011 | Geirhofer | H04W 52/08 370/252 |
| 2011/0268069 | A1* | 11/2011 | Song | H04W 72/1231 370/329 |
| 2011/0306349 | A1* | 12/2011 | Hakola | H04W 28/04 455/450 |
| 2012/0129562 | A1* | 5/2012 | Stamoulis | H04W 76/023 455/517 |
| 2012/0201158 | A1* | 8/2012 | Geirhofer | H04W 52/383 370/252 |
| 2012/0250531 | A1* | 10/2012 | Patil | H04W 8/005 370/252 |
| 2013/0077571 | A1* | 3/2013 | Papasakellariou | H04W 52/325 370/328 |
| 2013/0150061 | A1* | 6/2013 | Shin | H04W 4/005 455/450 |
| 2013/0272262 | A1* | 10/2013 | Li | H04W 28/02 370/330 |
| 2013/0310103 | A1* | 11/2013 | Madan | H04W 52/242 455/522 |
| 2013/0310106 | A1* | 11/2013 | Wang | H03K 17/955 455/550.1 |
| 2014/0051470 | A1* | 2/2014 | Patil | H04W 72/048 455/509 |
| 2014/0068023 | A1* | 3/2014 | Arickan | H04L 61/2015 709/220 |
| 2014/0226504 | A1* | 8/2014 | Tavildar | H04W 72/082 370/252 |
| 2014/0370904 | A1* | 12/2014 | Smith | H04W 8/005 455/450 |

FOREIGN PATENT DOCUMENTS

| | | |
|---|---|---|
| KR | 10-2013-0065002 | 6/2013 |
| KR | 10-2013-0065373 | 6/2013 |

* cited by examiner

FIG. 2
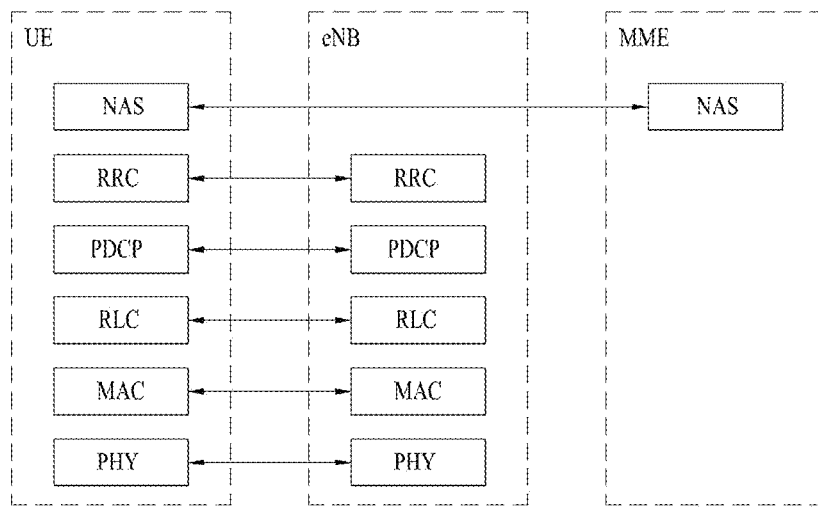
(a) control-plane protocol stack
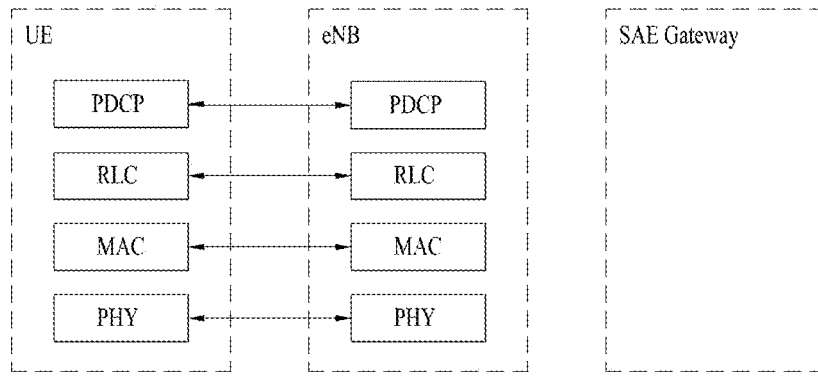
(b) user-plane protocol stack msg1 : Preamble transmission;
msg2 : Random access response;
msg3 : Layer 2 / Layer 3 (L2/L3) message for broadcast/groupcast;
msg4 : Contention resolution message.

(a) WAN initial access (b) D2D broadcast/groupcast

POWER CONTROL METHOD FOR DEVICE-TO-DEVICE (D2D) COMMUNICATION IN WIRELESS COMMUNICATION SYSTEM AND APPARATUS THEREFOR

CROSS-REFERENCE TO RELATED APPLICATIONS

This application is the National Stage filing under 35 U.S.C. 371 of International Application No. PCT/KR2014/005689, filed on Jun. 26, 2014, which claims the benefit of U.S. Provisional Application No. 61/844,838, filed on Jul. 10, 2013, the contents of which are all hereby incorporated by reference herein in their entirety.

TECHNICAL FIELD

The present invention relates to a wireless communication system, and more particularly, to a method of controlling power for D2D (device-to-device) communication in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

DISCLOSURE OF THE INVENTION

Technical Task

A technical task of the present invention is to provide a method of controlling power for D2D (device-to-device) communication in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of controlling transmit power, which is controlled by a first user equipment performing D2D (device-to-device) communication in a wireless communication system, includes the steps of receiving a first signal including power control information defined for the D2D communication from a base station and transmitting a second signal according to transmit power determined based on the received first signal. In this case, the power control information indicates one of broadcast and groupcast and the second signal is transmitted in a manner of being differently masked according to a transmission scheme of the second signal.

Preferably, the power control information can include at least one of a value defined to be proportional to a bandwidth for the broadcast communication for an initial access and a value according to an MCS (modulation and coding scheme) level.

Preferably, a signal transmit power value of the base station used for an initial access procedure with the first user equipment cannot not be applied to the transmit power. More preferably, the first signal includes a TPC (transmission power control) field and the transmit power can be determined by applying a value of the TPC field.

Preferably, if broadcast/groupcast transmission for the D2D communication is performed, the transmit power can be determined not to apply a pathloss compensation.

Preferably, if broadcast/groupcast transmission for the D2D communication is performed and a pathloss for the base station is less than a first threshold, the transmit power can be configured to be reduced. More preferably, the first threshold can be defined to be reduced as the first user equipment is getting close to the base station.

Preferably, if broadcast/groupcast transmission for the D2D communication is performed and the first user equipment is positioned at a cell edge, the transmit power can be configured to be reduced.

Preferably, the base station may correspond to a base station of a minimum pathloss among a plurality of base stations communicating with the first user equipment.

To further achieve these and other advantages and in accordance with the purpose of the present invention, according to a different embodiment, a first user equipment, which controls transmit power performing D2D (device-to-device) communication in a wireless communication system, includes a radio frequency unit and a processor, the processor configured to receive a first signal including power control information defined for the D2D communication from a base station, the processor configured to transmit a second signal according to transmit power determined based on the received first signal. In this case, the power control information indicates one of broadcast and groupcast and the second signal is transmitted in a manner of being differently masked according to a transmission scheme of the second signal.

Advantageous Effects

According to the present invention, it is able to efficiently perform power control for D2D (device-to-device) communication in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

BEST MODE

Mode for Invention

Figure 1:
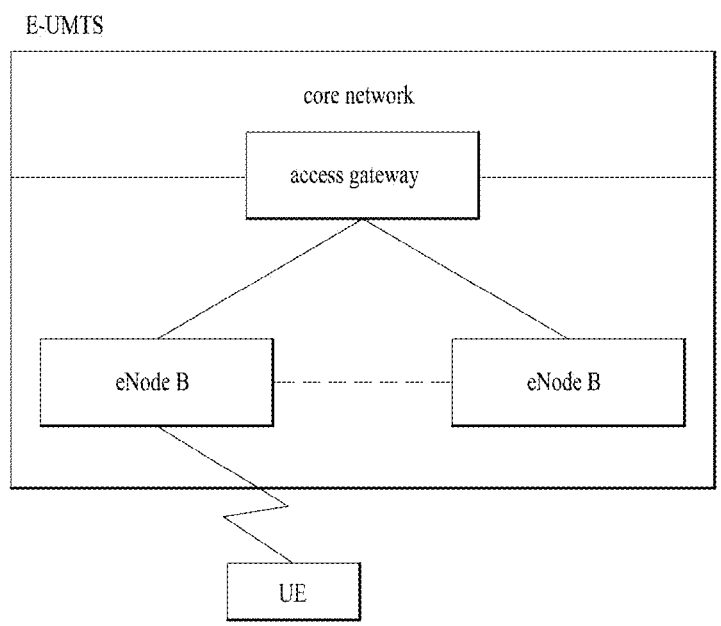
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, reconfiguration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
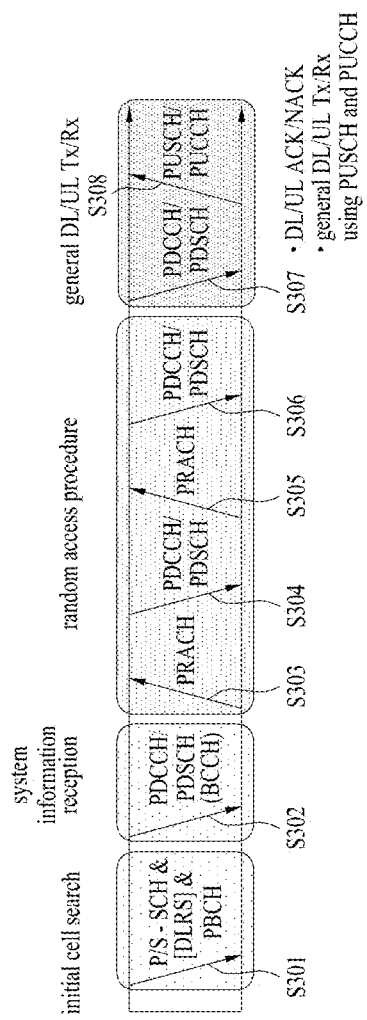
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
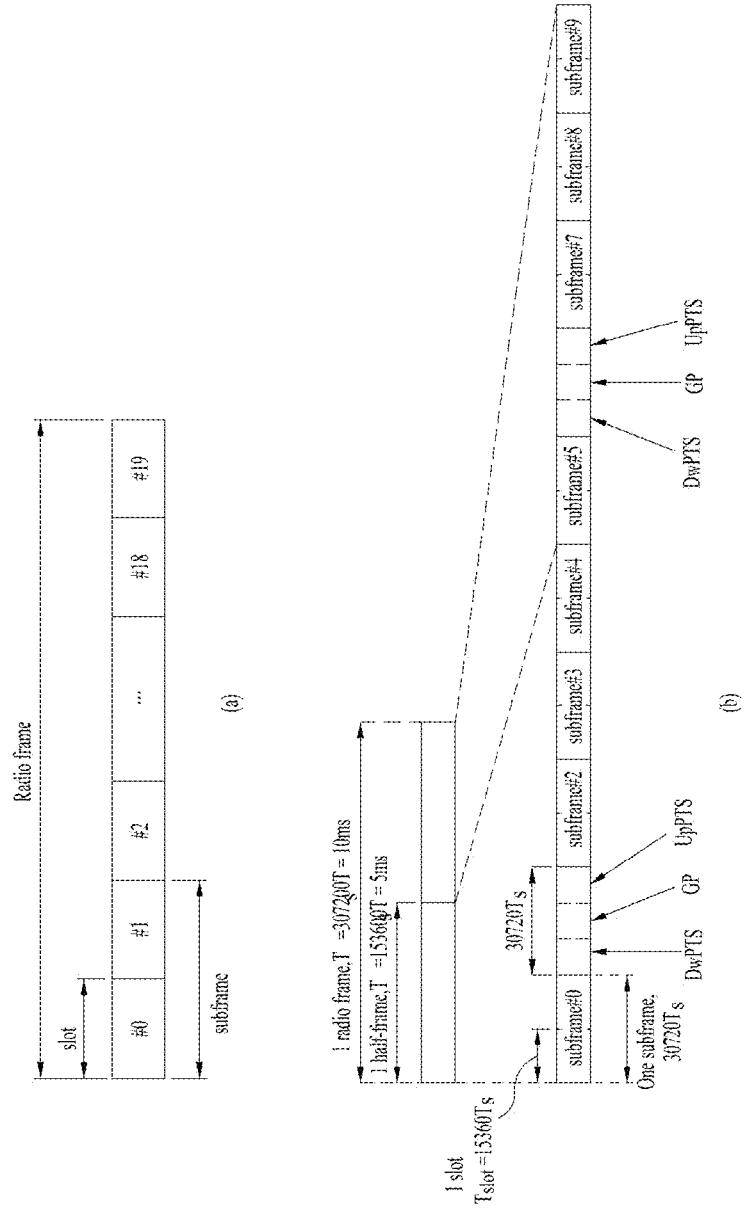
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
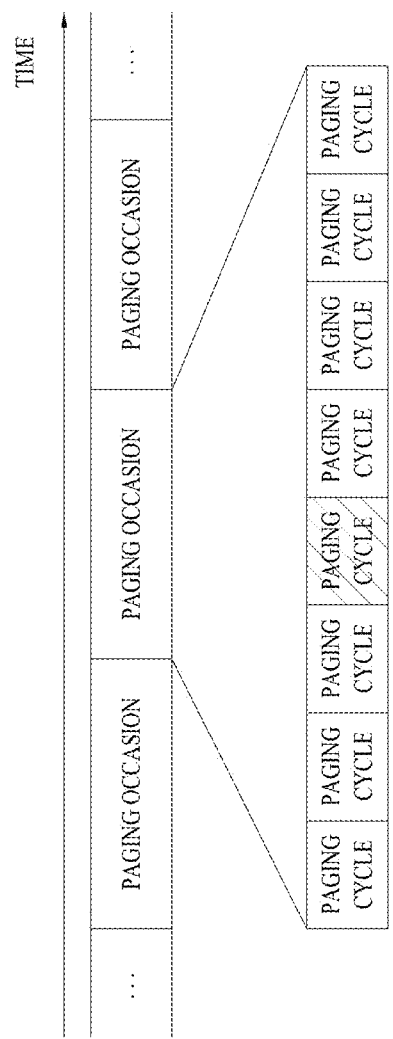
FIG. 5 is a diagram for explaining a general transceiving method using a paging message.

FIG. 5 is a diagram for explaining a general transceiving method using a paging message.

Referring to FIG. 5, a paging message includes a paging record consisting of a paging cause, a user equipment identity and the like. When the paging message is received, a user equipment may be able to perform a discontinuous reception (DRX) cycle for the purpose of power consumption reduction.

Specifically, a network may configure a plurality of paging occasions (PO) on every time cycle, which is called a paging cycle (paging DRX cycle). And, the network enables a specific user equipment to obtain a paging message by receiving a specific paging occasion only. The user equipment does not receive any paging channel except the corresponding specific paging occasion and may stay in an idle state to reduce power consumption. One paging occasion corresponds to one TTI (transmission time interval).

An eNode B and a user equipment use a paging indicator (hereinafter abbreviated PI) as a specific value for indicating a transmission of a paging message. The eNode B may

TABLE 1

| | Normal cyclic prefix in downlink | | | Extended cyclic prefix in downlink | | |
|---|---|---|---|---|---|---|
| | | UpPTS | | | UpPTS | |
| Special subframe configuration | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | 4384 · $T_s$ | 5120 · $T_s$ |
| 5 | 6592 · $T_s$ | 4384 · $T_s$ | 5120 · $T_s$ | 20480 · $T_s$ | | |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

In the meantime, the structure of the type 2 radio frame, that is, uplink/downlink configuration (UL/DL configuration) in the TDD system is as illustrated in Table 2 below.

define a specific identifier (e.g., paging-radio network temporary identity (P-RNTI)) with the purpose of PI usage and then may be able to inform the user equipment of a transmission of paging information. For instance, the user equipment wakes up on every DRX cycle and then receives one subframe to know whether a paging message has appeared. If the P-RNTI exists on a L1/L2 control channel (PDCCH) of the received subframe, the user equipment may be able to know that a paging message exists on a PDSCH of the corresponding subframe. And, if the paging message includes a user equipment identifier (e.g., IMSI) of the user equipment, the user equipment may be able to receive a service in response to the eNode B (e.g., RRC connection or system information reception).

In the following description, system information is explained. First of all, the system information may include essential information of which a user equipment should know to access an eNode B. Therefore, the user equipment should receive all system informations before accessing an eNode B and have latest system information all the time. Since system information is the information all user equipments in a cell should be aware of, the eNode B broadcasts the system information periodically.

System information may be divided into a master information block (MIB), a scheduling block (SB) and a system information block (SIB). The MIB enables a user equipment to know a physical configuration, e.g., bandwidth of a corresponding cell. Transmission information (e.g., transmission periods, etc.) of the SIBs are indicated by the SB. The SIB is a set of system informations related to each other. For instance, a specific SIB contains information on a neighbor cell only and a different SIB contains information on an uplink radio channel used by the user equipment only.

In the following, MBMS (multimedia broadcast multicast service) is explained. The MBMS (multimedia broadcast multicast service) is a sort of broadcast/multicast services and corresponds to a service transmitting a multimedia data packet to a plurality of terminals at the same time. 'Broadcast/multicast service' or 'MBMS' described in the present disclosure can be replaced with such different terminologies as 'point-to-multipoint service', 'MBS (multicast and broadcast service)' and the like. The MBMS is performed based on IP multicast. UEs share resources necessary for transmitting a data packet with each other and receive multimedia data identical to each other. Hence, if UEs of a prescribed level using the MBMS exist in an identical cell, resource efficiency can be enhanced. Since an MBMS service is irrelevant to an RRC connection state, a UE in an idle state can also receive the MBMS service.

Figure 7:
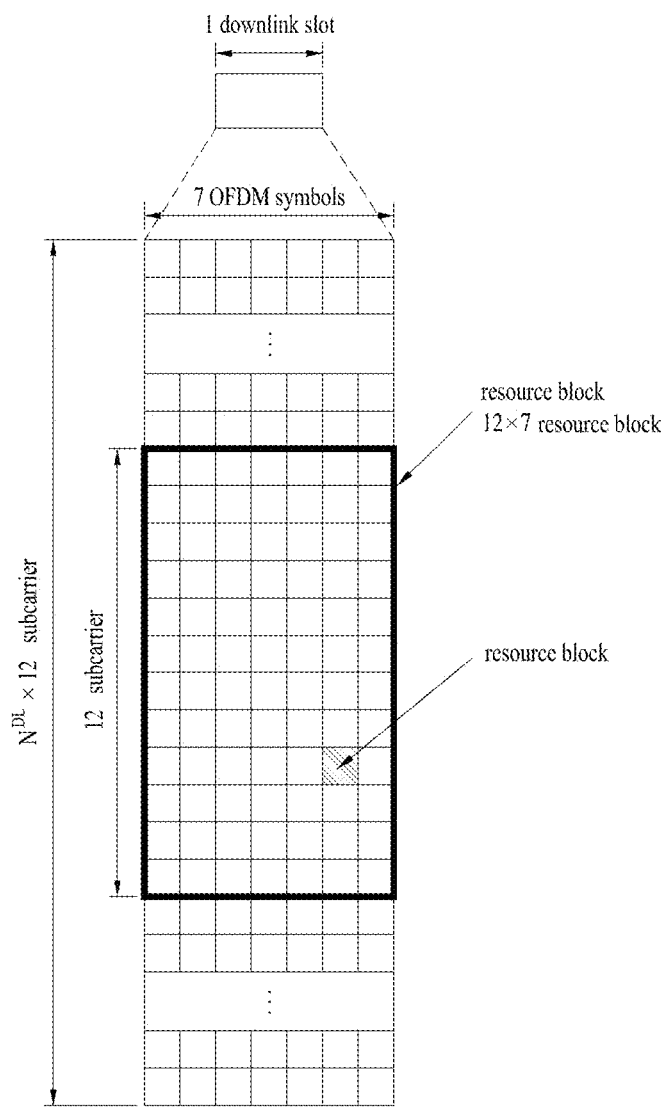
FIG. 7 is a diagram of a resource grid for a downlink slot.

A logical channel MCCH (MBMS control channel) or an MTCH (MBMS traffic channel) for the MBMS can be mapped to a transport channel MCH (MBMS channel). The MCCH transmits an RRC message including MBMS-related common control information and the MTCH transmits traffic of a specific MBMS service. A single MCCH exists in every single MBSFN (MBMS single frequency network) region transmitting identical MBMS information or traffic. If a plurality of MBSFN regions are provided in a single cell, a UE may receive a plurality of MCCHs. FIG. 7 shows a scheme of transmitting MCCH information.

Figure 6:
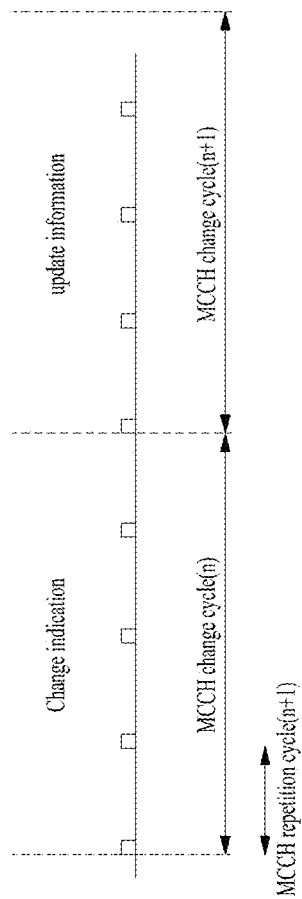
FIG. 6 is a diagram for a scheme of transmitting MCCH (MBMS control channel) information.

Referring to FIG. 6, if an MBMS-related RRC message changes on a specific MCCH, PDCCH transmits an MCCH indicator indicating M-RNTI (MBMS-radio network temporary identity) and the specific MCCH. A UE supporting MBMS identifies that the MBMS-related RRC message has changed on the specific MCCH in a manner of receiving the M-RNTI and the MCCH indicator via the PDCCH and may be then able to receive the specific MCCH. An RRC message on MCCH may change in every change cycle and can be broadcasted in every repeat cycle. FIG. 6 shows a scheme of transmitting MCCH information.

Meanwhile, MCCH transmits an MBMS session currently in progress and an MBSFNAreaConfiguration message indicating an RB configuration corresponding to the MBMS session. And, the MCCH may transmit an MBMSCountingRequest message to count the number of UEs in RRC connected state, which has received or intending to receive one or more MBMS services.

And, specific MBMS control information can be provided on BCCH. In particular, the specific MBMS control information can be included in SystemInformationBlockType13 broadcasted on the BCCH.

FIG. 7 is a diagram for an example of a resource grid for a downlink slot.

Referring to FIG. 7, a downlink slot includes $N_{symb}^{DL}$ OFDM symbols in time domain and $N_{RB}^{DL}$ resource blocks in frequency domain. Since each resource block includes $N_{sc}^{RB}$ subcarriers, a downlink slot includes $N_{RB}^{DL} \times N_{sc}^{RB}$ subcarriers in frequency domain. FIG. 7 shows an example that a downlink slot includes 7 OFDM symbols and a resource block includes 12 subcarriers, by which the present invention may be non-limited. For example, the number of OFDM symbols included in a downlink slot may vary according to a length of a cyclic prefix (CP)

Each element on a resource grid is called a resource element (hereinafter abbreviated RE) and one resource element is indicated by a single OFDM symbol index and a single subcarrier index. One RB consists of $N_{symb}^{DL} \times N_{sc}^{RB}$ resource elements. The number ($N_{RB}^{DL}$) of resource blocks included in a downlink slot is dependent on a downlink transmission bandwidth configured in a cell.

Figure 8:
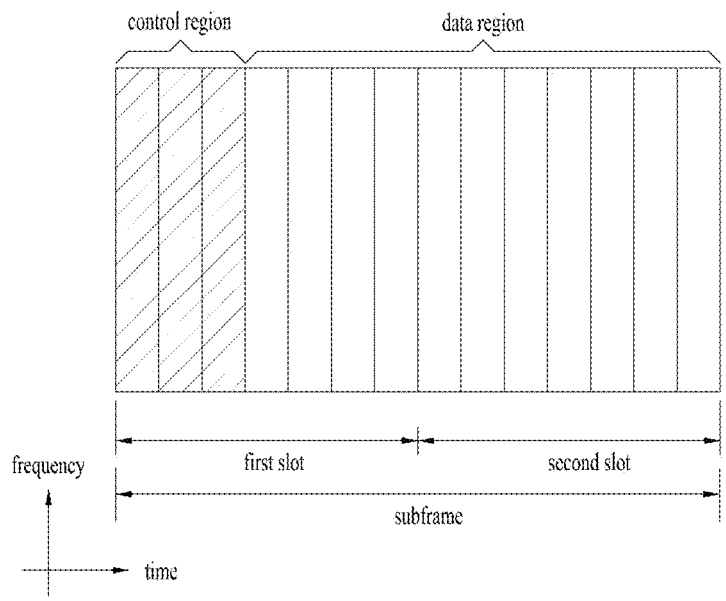
FIG. 8 is a diagram for an example of a structure of a downlink subframe.

FIG. 8 is a diagram for an example of a structure of a downlink subframe.

Referring to FIG. 8, maximum 3 (4) OFDM symbols situated in a head part of a first slot of one subframe correspond to a control region to which control channels are assigned. The rest of OFDM symbols correspond to a data region to which PDSCH (physical downlink shared channel) is assigned. Examples of DL control channels used by LTE may include PCFICH (Physical Control Format Indicator Channel), PDCCH (Physical Downlink Control Channel), PHICH (Physical hybrid ARQ indicator Channel) and the like. The PCFICH carried on a first OFDM symbol of a subframe carries the information on the number of OFDM symbols used for the transmission of control channels within the subframe. The PHICH carries HARQ ACK/NACK (hybrid automatic repeat request acknowledgement/negative acknowledgement) signal in response to an UL transmission.

Control information carried on PDCCH may be called downlink control information (DCI). The DCI includes resource allocation information for a user equipment or a user equipment group and different control information. For example, the DCI includes DL/UL scheduling information, UL transmit (Tx) power control command and the like.

PDCCH is able to carry a transmission format and resource allocation information of DL-SCH (downlink shared channel), a transmission format and resource allocation information of UL-SCH (uplink shared channel), paging information on PCH (paging channel), system information on DL-SCH, resource allocation information of an upper layer control message such as a random access response transmitted on PDSCH, a transmit power control command set for individual user equipments within a user equipment (UE) group, a transmit power control command, activation indication information of VoIP (voice over IP) and the like. A plurality of PDCCHs can be transmitted in a control region and a user equipment is able to monitor a plurality of the PDCCHs. PDCCH is transmitted on an aggregation of a plurality of contiguous control channel elements (CCEs). A CCE is a logical assignment unit used to provide PDCCH with a code rate in accordance with a state of a radio channel. A CCE corresponds to a plurality of REGs (resource element groups). A format of PDCCH and the number of bits of PDCCH are determined by the number of the CCEs. A base station determines a PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or usage of PDCCH. If the PDCCH is provided for a specific user equipment, the CRC can be masked with an identifier of the corresponding user equipment, i.e., C-RNTI (i.e., Cell-RNTI). As a different example, if the PDCCH is provided for a paging message, the CRC can be masked with a paging identifier (e.g., P-RNTI (Paging-RNTI)). If the PDCCH is provided for system information, and more particularly, for a system information block (SIB), the CRC can be masked with a system information identifier (e.g., SI-RNTI (system information-RNTI). If the PDCCH is provided for a random access response, the CRC can be masked with RA-RNTI (random access-RNTI).

Figure 9:
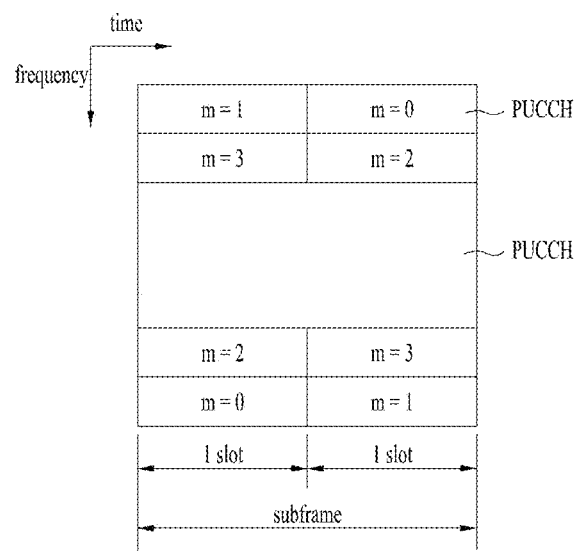
FIG. 9 is a diagram for an example of a structure of an uplink subframe in LTE.

FIG. 9 is a diagram for an example of a structure of an uplink subframe in LTE.

Referring to FIG. 9, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.
- SR (scheduling request): Information used for requesting uplink UL-SCH resource. OOK (on-off keying) scheme is used to transmit the SR.
- HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.
- CSI (channel state information): Feedback information on a DL channel. CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In case of introducing D2D communication to the aforementioned wireless communication system (e.g., 3GPP LTE system or 3GPP LTE-A system), a method of performing the D2D communication is explained in detail in the following description.

Figure 10:
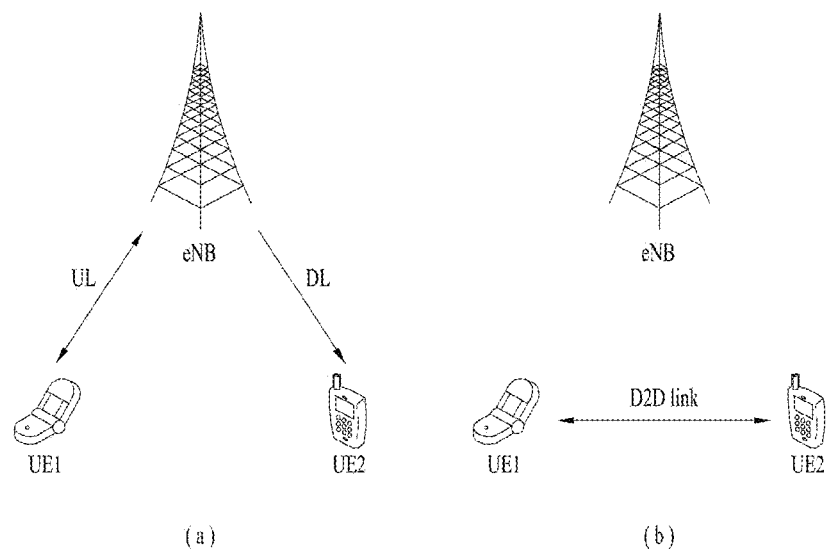
FIGS. 10 and 11 are diagrams for D2D communication.
Figure 11:
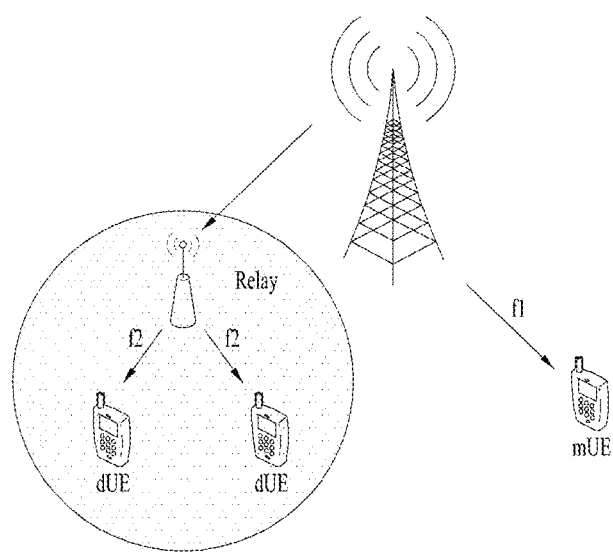

FIGS. 10 and 11 are diagrams for conceptually explaining D2D communication. FIG. 10 (a) shows a legacy communication scheme performed based on an eNB. A first UE (UE1) transmits data to an eNB in UL and the eNB can transmit the data received from the first UE (UE1) to a second UE (UE2) in DL.

FIG. 10 (b) shows a UE-to-UE communication scheme as an example of D2D communication. Data exchange between UEs can be performed without passing through an eNB. A link directly configured between devices can be called a D2D link. D2D communication has a merit in that latency is reduced and less radio resource is required compared to a legacy eNB-centered communication scheme.

Although D2D communication corresponds to a scheme of supporting device-to-device communication (UE-to-UE communication) without passing through an eNB, since the D2D communication is performed in a manner of reusing resources of a legacy wireless communication system (e.g., 3GPP LTE/LTE-A), it is necessary not to make any interference or interruption to the legacy wireless communication system. In the same context, it is also important to minimize interference affecting the D2D communication by a UE, an eNB and the like operating in the legacy wireless communication system.

In the following description, an operation of performing an MBMS (multimedia broadcast/multicast service), an operation of using the MBMS or an operation of introducing a service similar to the MBMS for UEs performing the D2D (device to device) communication proposed by the present invention is explained.

Referring to FIG. 11, UEs directly form a link with different UEs and can perform direct communication with the different UEs without passing through an eNB (i.e., D2D (device to device) communication). Although FIG. 11 shows one to one as a form of the D2D communication, the form of the D2D communication may have one to multi, multi to one and multi to multi. In the following, a situation including three entities including an eNB, a relay and a UE is explained for clarity as shown in FIG. 11. Yet, the present invention can also be extensively applied to a different communication system (i.e., communication link) including a small cell, femto-cell and femto-cell (femto-femto), an eNB and a UE (eNB-UE) and the like.

In the following, when a broadcast/groupcast operation is performed between UEs performing D2D communication proposed by the present invention, a method of controlling transmit power is explained based on the aforementioned discussion.

D2D communication does not receive a control signal from an eNB or receives a partial control signal only (compared to eNB-UE communication). The D2D communication has a characteristic that a transmission distance is shorter compared to eNB communication (WAN, Wide Area Network). One of main purposes of the D2D communication is to broadcast/groupcast disaster information in an emergency situation. In this case, it is necessary for all available UEs to transmit/receive the disaster information as quickly as possible.

Figure 12:
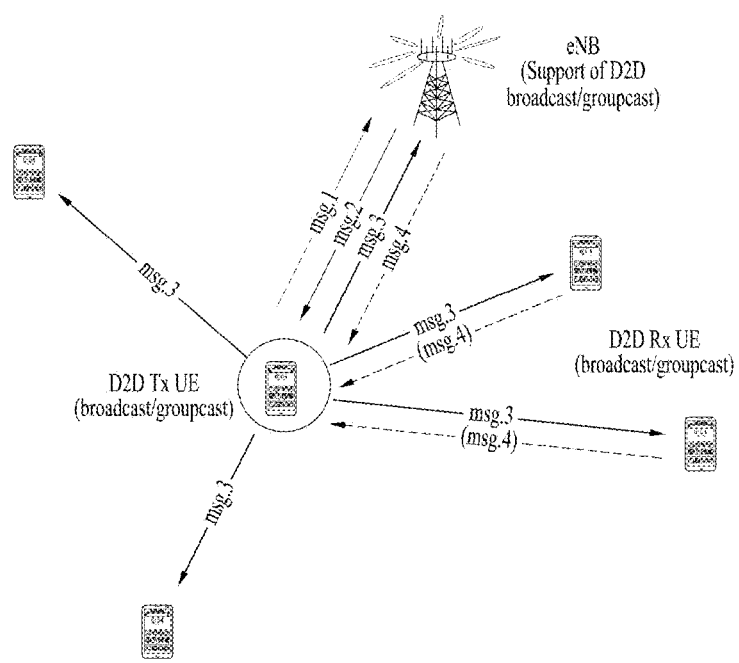
FIGS. 12 and 13 are diagrams for explaining RACH-based broadcast/groupcast communication and transmit power according to one embodiment of the present invention.

FIG. 12 is a diagram for one embodiment of a broadcast/groupcast structure explained in the present invention. In FIG. 12, assume that an embodiment of the present invention is performed by a transmission scheme consisting of 4 steps. If an emergency signal is transmitted by the scheme described in FIG. 12, the emergency signal can be transmitted not only to a UE in RRC connected state but also to a UE in idle state.

In FIG. 12, a step 1 (msg1) corresponds to a step of transmitting a preamble and a step 2 (msg2) corresponds to a step of transmitting a RAR (random access response) in response to the preamble transmission. In a step 3 (msg3), a UE can broadcast or groupcast a L2/L3 (layer 2/layer 3) message. In a step 4 (msg4), an eNB can transmit a contention resolution message.

Although the processes shown in FIG. 12 are similar to a PRACH procedure, a PRACH terminology and a procedure are introduced and explained for clarity of explanation only. Overall operation and function of the processes shown in FIG. 12 are different from the PRACH procedure. Yet, unless otherwise noted in the present invention, it can be interpreted as the PRACH procedure and the function are reused/applied for/to the processes shown in FIG. 12.

In the following description, transmit power control of msg3, which is an object of the present invention, is explained in detail.

In the following, an equation 1 corresponds to an equation capable of being used for determining power of msg3 of a RACH procedure used for an initial access of a UE when the UE performs communication with an eNB. The equation is briefly explained in the following (For details, it may refer to LTE-related standard, 3GPP TS 36.213, 5.1 paragraph "uplink power control").

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm]$$ [Equation 1]

In this case, $P_{CMAX,c}(i)$ corresponds to a maximum value of transmit power of a UE and $10\log_{10}(M_{PUSCH,c}(i))$ corresponds to a value determined according to the number (M) of RBs. And, $P_{O\_PUSCH,c}(j)$ corresponds to a value indicated by a higher layer signal and is configured by the sum of $P_{O\_NOMINAL\_PUSCH,c}(j)$ and $P_{O\_UE\_PUSCH,c}(j)$. And, $\alpha_c(j) \cdot PL_c$ corresponds to a compensation value for a path-loss. In case of PUSCH, $\alpha$ corresponds to a variable value. Yet, in case of an initial access, a DL pathloss is compensated in a manner of fixing the $\alpha$ by 1. And, $\Delta_{TF,c}(i)$ corresponds to a value according to a coefficient given by an MCS level and a higher layer signal. In case of an initial access, $f_c(i)$ is represented as $f_c(i) = \Delta P_{rampup} + \delta_{msg2}$. $\Delta P_{rampup}$ corresponds to a power value of which power is ramped up via a plurality of transmission attempts in PRACH (msg1) and $\delta_{msg2}$ corresponds to a TPC value indicated by an eNB in msg2.

Since the aforementioned WAN initial access is used for a UE to make a request for RRC connection to an eNB, a main process of the WAN initial access is to determine transmit power in accordance with a radio channel situation between the eNB and the UE.

On the contrary, although a legacy RACH procedure is reused for a prompt D2D transmission and reception operation of an idle UE, since a purpose of D2D broadcast/groupcast to which the present invention is applied is to transmit emergency information to a different UE by a UE, it is more important to transmit the emergency information to neighboring many random UEs (or a part of a plurality of UEs) with coverage as wide as possible.

Hence, according to the present invention, it is preferable to use a procedure of determining power used in the legacy RACH procedure in a manner of modifying the procedure of determining power in accordance with the D2D broadcast/groupcast. Hence, among the aforementioned processes including the msg1 to msg4 shown in FIG. 12, since the msg1 and the msg2 correspond to processes between an eNB and an UE, the msg1 and the msg2 may follow a legacy power control as it is. Yet, since the msg3 corresponds to a procedure for a D2D UE to directly transmit information to different UEs, it is necessary to use a power control procedure of the msg3 in a manner of applying an embodiment of the present invention to the power control procedure of the msg3.

First of all, according to the embodiment of the present invention, broadcast and groupcast can be distinguished from each other in a manner of differently masking the msg3. For example, if a C-RNTI (cell-radio network temporary identifier) defined for broadcasting is called a BC-RNTI and a C-RNTI (cell-radio network temporary identifier) defined for groupcasting is called a GC-RNTI, masking can be differently performed in a manner of using the BC-RNTI for a broadcast msg3 and the GC-RNTI for a groupcast msg3, respectively. By doing so, reception D2D UEs can determine whether a received msg3 is broadcasted or groupcasted.

As a different example, an RAR msg2, which is transmitted to a UE in response to the msg1, may include a field for distinguishing broadcast from groupcast or a field for classifying IDs of a group. Hence, if UEs receive the RAR and check the field, the UEs can determine whether an msg3 to be transmitted is broadcasted or groupcasted.

A method of securing broadcast coverage of a prescribed level is explained according to the present invention. A biggest purpose of a broadcast/groupcast msg3 is to transmit emergency information. Hence, one of main purposes of power control is to secure broadcast coverage of a prescribed level at any situation. Hence, it is necessary to have a part configured to compensate for elements capable of making a change on coverage whenever transmission is performed.

Hence, according to the present invention, first of all, it is able to determine transmit power in a manner of totaling up such a clause as $10\log_{10}(M)$ in proportion to a bandwidth (the number of broadcast RBs, M). In doing so, although the number of broadcast resource blocks (broadcast RBs) changes, transmit power per RB can be constantly maintained. Moreover, coverage of broadcast/groupcast can be constantly maintained. For example, if 20 RBs are used for the usage of broadcast/groupcast, a signal can be transmitted using identical power per RB and identical coverage can be maintained only when a signal is transmitted using power as much as twice (3 dB) compared to a 10RB broadcast signal.

Secondly, it may use $\Delta_{TF,c}(i)$ as it is. While the $10\log_{10}(M)$ is used for compensating for a coverage change according to the number of RBs, $\Delta_{TF,c}(i)$ can secure constant power according to a code bit although MCS is changed.

In particular, it indicates that a transmit power value per single code bit is constantly maintained. For example, although a same codeword is used, bits per RE (BPRE) of QPSK modulation correspond to 2 bits and bits per RE (BPRE) of 16QAM modulation correspond to 3 bits. Hence, there exists a difference of 1.5 times. In this case, when the 16QAM is used, if more power as much as 1.5 times is provided, it may be able to form identical coverage, since power per code bit becomes identical to each other.

Moreover, it may be able to maintain a condition of $\Delta_{TC,c}(i)=10 \log 10(2^{BPRE \cdot K_s}-1)$ used for an initial access as it is. In this case, BPRE corresponds to the number of code bits per RE and $K_s$ corresponds to a constant number defined in advance. In order to allocate same power per bit, the $K_s$ should be configured by 1. Yet, in terms of constant coverage, values (e.g., 1.2 or 1.5) greater than 1 may be preferable in consideration of channel estimation and encoding/decoding.

According to the present invention, unlike a request of RRC connection, it may be able to configure as $f_c(i)=0$ for D2D broadcast/groupcast. In general, $f_c(i)$ determines transmit power on the basis of transmit power ramped up by an eNB until the eNB successfully receives PRACH. Yet, since it is necessary to consider a channel between UEs only irrespective of an eNB channel in an msg3 situation of the present invention, if power of the PRACH becomes a reference, it may cause a change of broadcast coverage and it may correspond to unnecessary power control.

Hence, it is preferable not to use a PRACH ramping component of $f_c(i)$ in the broadcast/groupcast msg3. For example, it may have identical coverage in a manner of setting the $f_c(i)$ to 0. In this case, since a TPC field of an RAR (msg2) is not necessary, i) it may delete the TPC field, ii) it may use the TPC field for a different usage, or iii) it may perform padding by a value of "0".

Or, the PRACH ramping component of the $f_c(i)$ is reset and it may be then able to reflect a value of the TPC field of the msg2 only. When it is necessary for an eNB to control msg3 transmit power according to a D2D UE, this can be very helpful.

Figure 13:
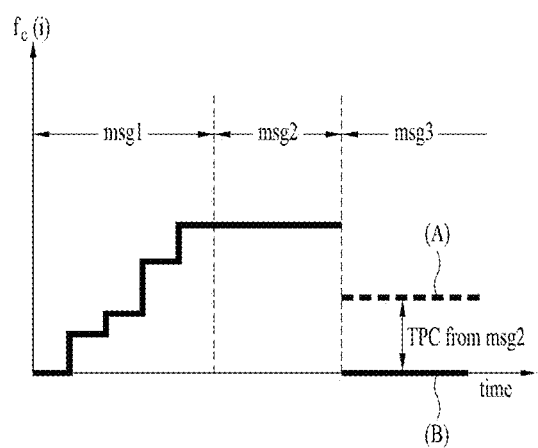

The aforementioned example is explained with reference to FIG. 13. Assume that a corresponding UE repeatedly transmits an msg1 instead of transmitting the msg1 at a time when the msg1 is transmitted. And, assume that $f_c(i)$ increases whenever transmission is performed to increase transmit power for higher reception probability of the msg1. A straight line (i.e., (B)) of the msg3 indicates a case of $f_c(i)=0$ and a dotted line (i.e., (A)) indicates a case that a ramping value is reset only and a TPC field value is recognized.

Figure 14:
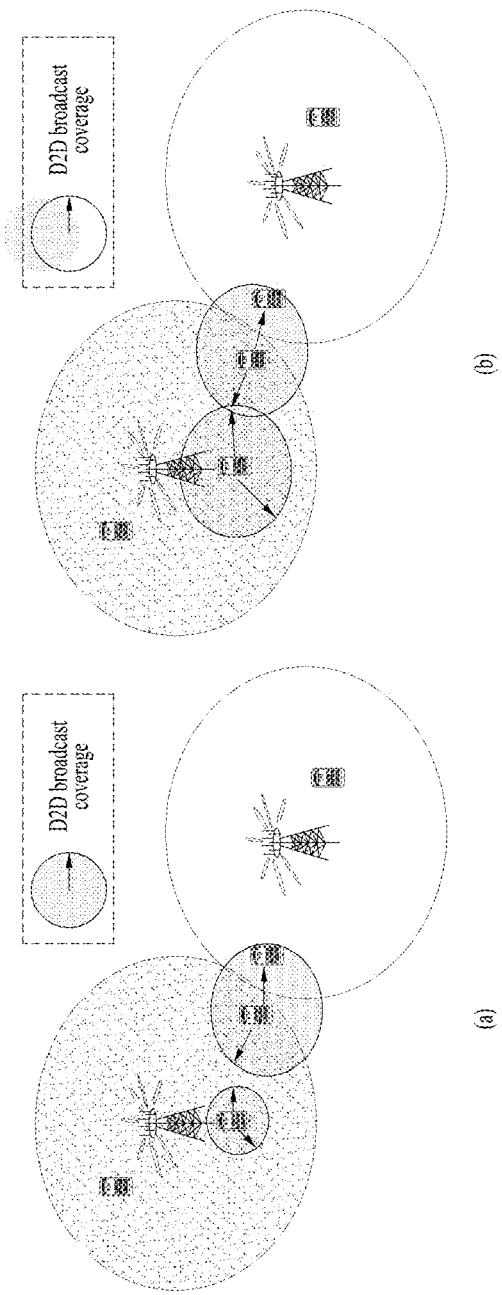
FIG. 14 is a diagram for explaining one embodiment of the present invention for constantly maintaining coverage.

FIG. 14 is a diagram for explaining a method of configuring a pathloss between a UE and an eNB to constantly secure network coverage according to the present invention.

For example, a legacy RACH msg3 uses a power value in proportion to a pathloss. It may assume that the legacy RACH msg3 is used as it is in D2D broadcast/groupcast. In this case, in order to compensate for a loss according to the pathloss, UEs close to an eNB transmit a broadcast/groupcast signal with low power and UEs far from the eNB transmit a broadcast/groupcast signal with high power. Hence, as shown in FIG. 14 (a), broadcast/groupcast coverages of UEs are differently formed according to each UE.

Since the aforementioned characteristic is not preferable for the broadcast/groupcast mainly used for an emergency situation, it may be preferable not to apply the pathloss compensation to secure coverage as constantly wide as possible. For example, since the msg1 corresponds to a procedure of communicating with an eNB, although a pathloss coefficient α is able to have a nonzero value (including 0), the pathloss coefficient α is set to 0 to get rid of a pathloss dependent component when the msg3 is transmitted. By doing so, as shown in FIG. 14 (b), it is able to constantly secure coverage irrespective of a position within a cell.

In addition, unlike FIG. 14, when a UE is too close to an eNB, if the pathloss coefficient α is set to 0 and the UE is forced to have prescribed coverage, a problem of deteriorating performance of overall cell may occur.

Hence, when UEs close to an eNB broadcast the msg3 with high power in a D2D situation, it may directly affect a UL resource as huge interference or it may affect a neighbor UL resource as huge emission interference. This may directly cause considerable performance degradation via SINR deterioration of WAN UL and may indirectly cause performance degradation via AGC (automatic gain control saturation) of a reception unit of the eNB. In order to overcome the aforementioned problem, it is necessary for the UEs close to the eNB to reduce broadcast power.

Hence, according to the present invention, if a UE becomes a UE close to an eNB in a manner of calculating a pathloss of the eNB, it may be able to reduce transmit power of the msg3. For example, if the pathloss is lower than a prescribed value (i.e., if the UE is close to the eNB), a prescribed offset of a negative number can be reflected when the transmit power of the msg3 is calculated.

Moreover, a graph of the transmit power according to the pathloss may have a shape of a step. Yet, in this case, if a UE is positioned at a boundary point of which the power is reduced in a shape of a step (i.e., if the transmit power is rapidly reduced), broadcast coverage can also be rapidly reduced according to a movement of the UE. As a result, D2D Rx UEs positioned at a broadcast boundary have no choice but to suddenly stop receiving the broadcasting. Hence, in order to supplement this, if a pathloss is lower than a prescribed value, it may be able to configure power to be continuously and incrementally increased in a manner of appropriately configure a value and an offset of a negative number.

Figure 15:
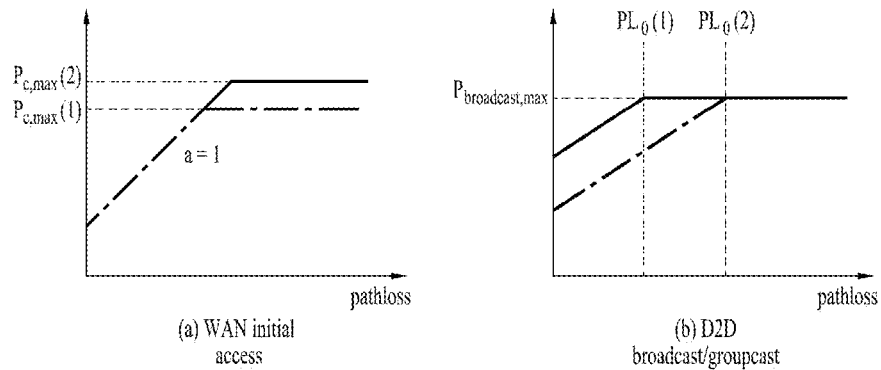
FIGS. 15 and 16 are diagrams for explaining D2D power control of the present invention considering a distance to an eNB and a cell boundary.

A method of controlling power according to a value and an offset of a negative number is explained with reference to FIG. 15 in the following. RACH power control increases in a linear form according to a pathloss with an eNB until a maximum transmission value. On the contrary, according to the present invention, the RACH control increases with a constant value (or increases in a linear form) until a threshold of the eNB pathloss and may have a (fixed) constant number value after the threshold of the eNB pathloss. In this case, $P_{broadcast,max}$ corresponds to a D2D broadcast maximum power value defined in advance. This value can be represented as equation 2 in the following.

$$P_{broadcast} = \min \begin{cases} P_{broadcast,max} \\ a\,PL + (P_{broadcast,max} - a\,PL_0) + \Delta OS_{basic} \end{cases} \quad \text{[Equation 2]}$$

In equation 2, PL corresponds to a pathloss and $\Delta OS_{basic}$ corresponds to a value (e.g., offset) of which all clauses except the pathloss are summed. α and $PL_0$ correspond to a coefficient value and a threshold, respectively, configured by an eNB. In particular, in order to represent an effect for the pathloss only, a graph, which is simplified in a manner of assuming the $\Delta OS_{basic}$ as 0, is shown in FIG. 15.

In particular, power increases with a slope α according to a pathloss when the pathloss is equal to or less than a threshold. If the pathloss is equal to or greater than the threshold, transmission is performed by maximum power. In this case, in order to quickly reduce power in the vicinity of an eNB, α can be configured by a value greater than 1. If the $PL_0$ is set to $-\infty$ dB, as mentioned earlier with reference to FIG. 14, transmit power is constantly maintained irrespective of a pathloss to secure coverage of D2D broadcast.

Moreover, if a UE is positioned near a cell boundary, the UE may considerably interfere with a neighboring cell. Hence, a value $P_{broadcast}$ transmitted within a cell may considerably interfere with an UL resource of the neighboring cell. Thus, the UE calculates a pathloss of an eNB and determines whether the pathloss is equal to or greater than a threshold. If the pathloss is equal to or greater than the threshold, the UE can reduce transmit power of the msg3 again.

Figure 16:
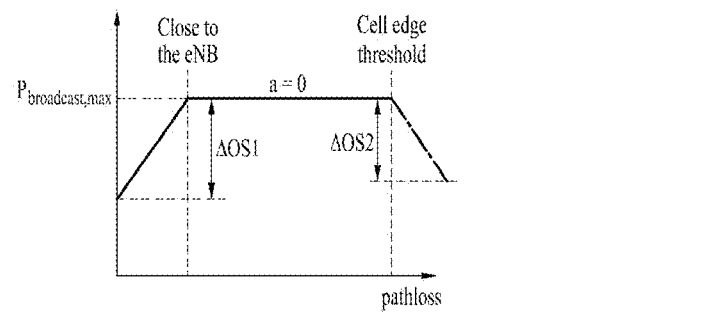

FIG. 16 shows an embodiment related to a D2D broadcast transmit power control in a cell edge. Referring to FIG. 16, similar to a case of being close to an eNB, if a pathloss is equal to or greater than a threshold, it may be able to apply an offset of a negative number. Or, power can be reduced in a linear form in a manner of combining α value and an offset of a negative number with each other.

And, according to the present invention, if a plurality of eNBs (including RRH of a pico and femto) exist in the vicinity of a UE, a D2D broadcast transmit power control operation can be performed on the basis of an eNB of a minimum pathloss among pathloss of neighboring eNBs instead of a pathloss of a serving eNB.

Figure 17:
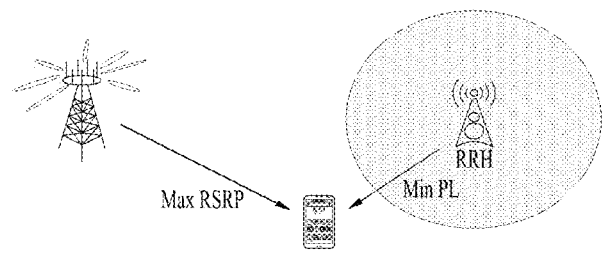
FIG. 17 is a diagram for an embodiment for a case that many eNBs exist according to the present invention.

FIG. 17 is a diagram for explaining a D2D broadcast transmit power control according to the present invention when a plurality of eNBs exist.

As shown in a pico cell scenario shown in FIG. 17, since transmit power (e.g., macro BS: 42 dBm, RRH: 30 dBm) may be different from each other between eNBs. A base station (macro BS) on the basis of maximum RSRP and a base station (pico cell RRH) on the basis of a minimum pathloss (minimum PL) may be different from each other. In this case, it is preferable to make a pathloss of a pico cell RRH to be a reference of a pathloss for performing a D2D broadcast transmit power control because a pico cell is more affected by interference since the pico cell has less pathloss.

Moreover, the aforementioned method of configuring a pathloss coefficient (i.e., α) according to a pathloss can be replaced with a method of configuring a based on RSRP. Yet, in a relation of 'RSRP=Tx RS power−pathloss' [dB], since a pathloss and RSRP are in a reciprocal relation, if an RSRP value is greater, it indicates a case of being close to an eNB. If the RSRP is smaller, it indicates a case of being positioned at a cell edge.

In the aforementioned description, the present invention is explained on the basis of overall transmit power of a UE. Yet, the aforementioned contents of the present invention can also be applied in terms of PSD (power spectral density) instead of the overall transmit power. In this case, transmit power (i.e., P) may indicate transmit power allocated to a unit RB (or RE) rather than the total power of the whole of frequency resources.

Hence, in the aspect of the PSD, power per unit RB (or RE) is determined according to the aforementioned present invention. If the power is multiplied by a broadcast/groupcast RB (or RE), it may be able to obtain total transmit power. Moreover, if power is controlled by the PSD, it may be more preferable in terms of broadcast/groupcast coverage.

In particular, if the present invention is applied based on the PSD, the compensation clause 10 log 10(M) according to the number of RBs is not considered and maximum power $PSD_{max,RB}$ (or $PSD_{max,RE}$) can be induced by various methods. For example, the RB maximum transmit power $PSD_{max,RB}$ can be defined by a value obtained from dividing the total transmit power $P_{c,MAX(i)}$ by M and the value may correspond to a value determined by an eNB in advance. A power control value can be represented as equation 3 in the following using the $PSD_{max,RB}$.

$$PSD_{broadcast,RB} = \min \begin{cases} PSD_{broadcast,max,RB} \\ \alpha PL + (PSD_{broadcast,max,RB} - \alpha PL_0) + \Delta OS_{basic} \end{cases}$$ [Equation 3]

In particular, in a power transmission equation of an initial access, $P_{O\_PUSCH,c}(2)$ for PUSCH (re)transmission corresponding to an RAR (random access response) consists of $P_{O\_PUSCH,c}(2) = P_{O_{PRE}} + \Delta_{PREAMBLE\_Msg3}$. In this case, each of parameters can be provided via a higher layer signal. In this case, $P_{O\_PRE}$ corresponds to a cell-specific higher layer value, which is called preambleInitialReceivedTargetPower. This value corresponds to a value interlocked with transmit power of a PRACH signal (msg1). Hence, this value can be used for the usage of controlling internal/external interference of a cell in a D2D broadcast operation.

In particular, similar to a method of controlling α based on total transmit power, an eNB calculates a pathloss of msg1 (PRACH) or an RSRP value of the msg1 from a UE and determines whether the UE is too close to the eNB (e.g., FIG. 15) or the UE is positioned near a cell edge (e.g., FIG. 16). If it is determined as the UE is too close to the eNB or the UE is positioned near the cell edge, the $P_{O\_PRE}$ value is configured by a small value. On the contrary, if the UE is positioned within a cell, which is appropriate in terms of uplink (UL) interference heading to the eNB or a neighbor cell, it is preferable to configure the $P_{O\_PRE}$ by a value as big as possible to widen coverage of broadcast according to a characteristic of the broadcast used for an emergency situation. Moreover, the $P_{O\_PRE}$ value is provided via a higher layer signal different from a PRACH configuration parameter and the higher layer signal should have a UE-specific characteristic.

Figure 18:
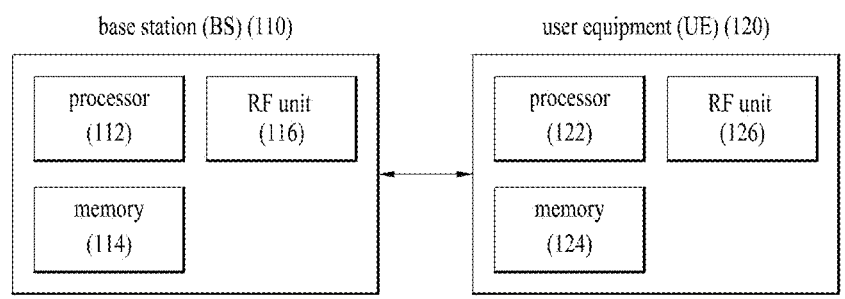
FIG. 18 is a diagram for a base station and a user equipment applicable to one embodiment of the present invention.

FIG. 18 is a diagram for a base station and a user equipment applicable to one embodiment of the present invention. If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 18, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor. The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although the aforementioned method of performing a broadcast/multicast service for D2D (device-to-device) communication in a wireless communication system and an apparatus therefor are described centering on examples applied to 3GPP LTE system, it may be applicable to various kinds of wireless communication systems as well as to the 3GPP LTE system.

What is claimed is:

1. A method of controlling transmit power by a first user equipment (UE) performing D2D (device-to-device) communication in a wireless communication system, comprising the steps of:
   receiving, from a base station, a first message containing power control information,
   wherein the power control information includes a pathloss compensation value; and
   transmitting a second message with a transmit power determined by the first UE in accordance with the received power control information,
   wherein, when the second message is for one of a broadcast or a groupcast for D2D communication:
      the transmit power is determined without applying the pathloss compensation value,
      if the pathloss is equal or lower than an eNB pathloss threshold, the transmit power is configured to be linearly increased, and
      if the pathloss is equal or greater than a cell edge threshold, the transmit power is configured to be linearly decreased.

2. The method of claim 1, wherein the power control information further includes at least one of a value defined to be proportional to a bandwidth for the broadcast communication for an initial access and a value according to an MCS (modulation and coding scheme) level.

3. The method of claim 1, wherein a message transmit power value of the base station used for an initial access procedure with the first user equipment is not applied to the transmit power.

4. The method of claim 3,
   wherein the first message comprises a TPC (transmission power control) field, and
   wherein the transmit power is determined by applying a value of the TPC field.

5. The method of claim 1, wherein the base station corresponds to a base station of a minimum pathloss among a plurality of base stations communicating with the first user equipment.

6. The method of claim 1, wherein, when the second message is not for one of the broadcast or the groupcast for D2D communication the transmit power is determined by applying the pathloss compensation value.

7. The first user equipment of claim 1, wherein, when the second message is not for one of the broadcast or the groupcast for D2D communication the transmit power is determined by applying the pathloss compensation value.

8. A first user equipment (UE), which controls transmit power performing D2D (device-to-device) communication in a wireless communication system, comprising:
   a radio frequency unit; and
   a processor, the processor configured to
      receive, from a base station, a first message containing power control information,
      wherein the power control information includes a pathloss compensation value, and
      transmit a second message with a transmit power determined by the first UE in accordance with the received power control information,
      wherein when the second message is for one of a broadcast or a groupcast for D2D communication:
         the transmit power is determined without applying the pathloss compensation value,
         if the pathloss is equal or lower than an eNB pathloss threshold, the transmit power is configured to be linearly increased, and
         if the pathloss is equal or greater than a cell edge threshold, the transmit power is configured to be linearly decreased.

9. The first user equipment of claim 8, wherein the power control information further includes at least one of a value defined to be proportional to a bandwidth for the broadcast communication for an initial access and a value according to an MCS (modulation and coding scheme) level.

10. The first user equipment of claim 8, wherein a message transmit power value of the base station used for an initial access procedure with the first user equipment is not applied to the transmit power.

11. The first user equipment of claim 10,
wherein the first message comprises a TPC (transmission power control) field, and
wherein the transmit power is determined by applying a value of the TPC field.

12. The first user equipment of claim 8, wherein the base station corresponds to a base station of a minimum pathloss among a plurality of base stations communicating with the first user equipment.

* * * * *